A

(12) United States Patent
Hanel et al.

(10) Patent No.: US 11,218,299 B2
(45) Date of Patent: Jan. 4, 2022

(54) SOFTWARE ENCRYPTION

(71) Applicant: TRUSTONIC LIMITED, Cambridge (GB)

(72) Inventors: Lukas Hanel, Cambridge (GB); Mehdi Oukacha, Cambridge (GB); Baptiste Gourdin, Cambridge (GB)

(73) Assignee: Trustonic Limited, Cambridge (GB)

( * ) Notice: Subject to any disclaimer, the term of this patent is extended or adjusted under 35 U.S.C. 154(b) by 150 days.

(21) Appl. No.: 16/781,204

(22) Filed: Feb. 4, 2020

(65) Prior Publication Data

US 2020/0252207 A1 Aug. 6, 2020

(30) Foreign Application Priority Data

Feb. 5, 2019 (GB) ..................................... 1901596

(51) Int. Cl.
*H04L 9/08* (2006.01)
*G06F 8/65* (2018.01)
*H04L 9/32* (2006.01)
*H04L 29/06* (2006.01)
*G06F 21/57* (2013.01)
*G06F 21/53* (2013.01)
(Continued)

(52) U.S. Cl.
CPC ................ *H04L 9/085* (2013.01); *G06F 8/65* (2013.01); *H04L 9/083* (2013.01); *H04L 9/0894* (2013.01); *H04L 9/3247* (2013.01); *G06F 2221/2149* (2013.01)

(58) Field of Classification Search
CPC ....... H04L 9/085; H04L 9/083; H04L 9/0894; H04L 9/3247; H04L 9/0897; H04L 63/062; H04L 9/08; G06F 8/65; G06F 2221/2149; G06F 21/572; G06F 21/53; G06F 21/602; G06F 21/74
See application file for complete search history.

(56) References Cited

U.S. PATENT DOCUMENTS 8,645,716 B1 * 2/2014 Dujari ..................... G06F 21/71
713/193
10,963,593 B1 * 3/2021 Campagna ............ G06F 21/602
(Continued)

FOREIGN PATENT DOCUMENTS

EP 3 346 415 7/2018

OTHER PUBLICATIONS

Search and Examination Report for GB1901596.5, dated Jul. 18, 2019, 5 pages.

*Primary Examiner* — Darren B Schwartz
(74) *Attorney, Agent, or Firm* — Nixon & Vanderhye P.C.

(57) ABSTRACT

A software decryption key is injected into a computing device 2 having a secure execution environment 20 and a less secure execution environment 22. The key 38 is for decryption of software to be run on the computing device. A key injection software component 36 executed within the secure execution environment 20 is used to control storage of the software decryption key 38 in a protected state in which the software decryption key is unreadable in the clear from the key storage location by an external device or by program code executed in the less secure execution environment 22 of the computing device. Software provided to the device is decrypted based on the injected software decryption key 38.

17 Claims, 6 Drawing Sheets

(51) Int. Cl.
  *G06F 21/60* (2013.01)
  *G06F 21/74* (2013.01)

(56) References Cited

U.S. PATENT DOCUMENTS

| | | | |
|---|---|---|---|
| 2005/0182952 A1* | 8/2005 | Shinozaki | G06F 21/575 713/189 |
| 2006/0090084 A1* | 4/2006 | Buer | G06F 21/575 713/189 |
| 2006/0130130 A1 | 6/2006 | Kablotsky | |
| 2010/0122088 A1* | 5/2010 | Oxford | H04L 9/14 713/168 |
| 2010/0174919 A1* | 7/2010 | Ito | G06F 21/554 713/192 |
| 2011/0010770 A1* | 1/2011 | Smith | H04L 9/3213 726/18 |
| 2011/0246707 A1* | 10/2011 | Ito | G06F 12/0246 711/103 |
| 2013/0254537 A1* | 9/2013 | Bogorad | G06F 21/602 713/165 |
| 2013/0266137 A1* | 10/2013 | Blankenbeckler | G11B 20/00137 380/44 |
| 2014/0010371 A1* | 1/2014 | Khazan | H04L 9/0894 380/278 |
| 2014/0016776 A1* | 1/2014 | Van Foreest | H04L 9/0869 380/46 |
| 2014/0149748 A1* | 5/2014 | Ang | G06F 21/57 713/189 |
| 2014/0181498 A1* | 6/2014 | Rhee | G06F 21/575 713/2 |
| 2014/0359268 A1* | 12/2014 | Jauhiainen | G06F 21/44 713/2 |
| 2015/0010151 A1* | 1/2015 | Roelse | H04N 21/8166 380/210 |
| 2015/0113278 A1* | 4/2015 | Cocchi | H04L 9/3247 713/171 |
| 2016/0034702 A1* | 2/2016 | Sikka | G06F 9/45558 726/27 |
| 2016/0070932 A1* | 3/2016 | Zimmer | G06F 21/53 713/192 |
| 2016/0094548 A1 | 3/2016 | Lee et al. | |
| 2016/0182238 A1* | 6/2016 | Dewan | H04L 9/3242 713/171 |
| 2017/0090909 A1* | 3/2017 | Guo | G06F 21/57 |
| 2017/0302456 A1* | 10/2017 | Visoky | H04L 63/0428 |
| 2019/0087578 A1* | 3/2019 | Govindarajan | G06F 21/602 |
| 2019/0349346 A1* | 11/2019 | Curtis | H04L 63/0428 |
| 2020/0044865 A1* | 2/2020 | Ward | G06F 21/10 |
| 2021/0091952 A1* | 3/2021 | Wentz | H04L 9/3247 |

* cited by examiner

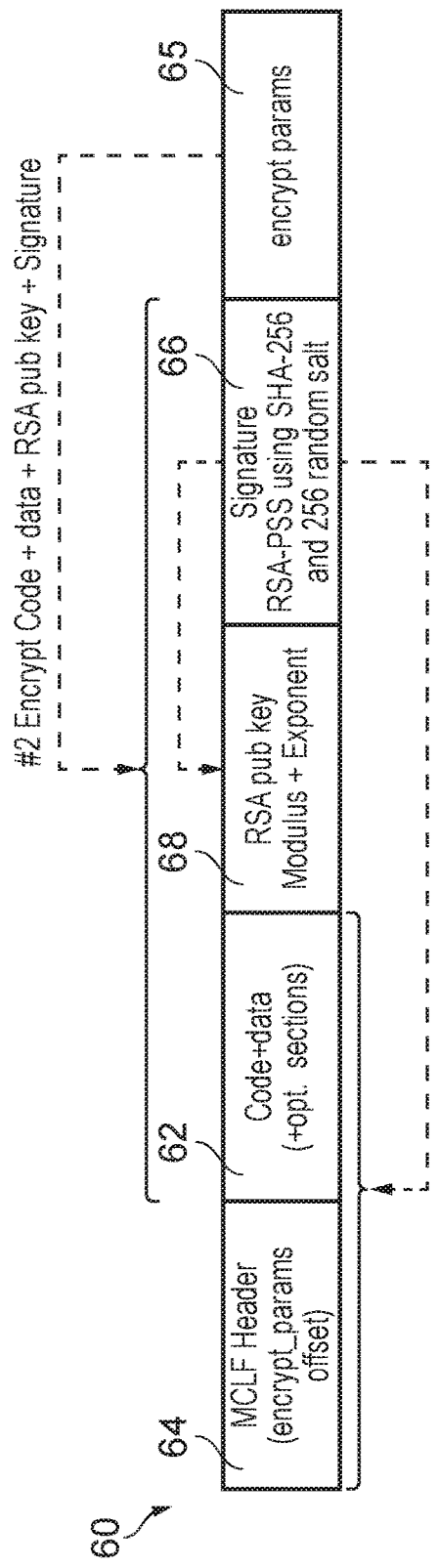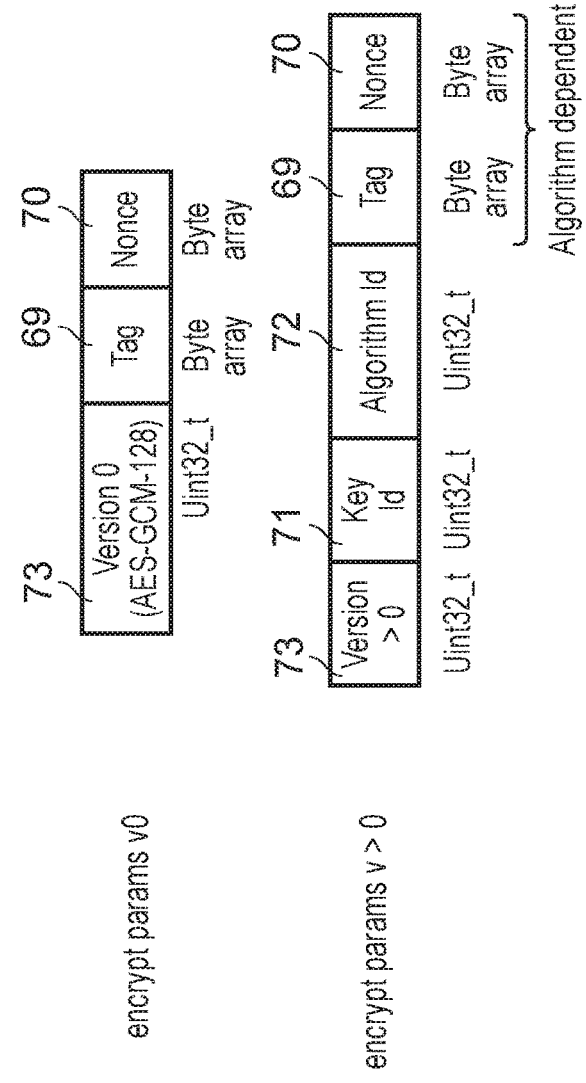

SOFTWARE ENCRYPTION

This application claims priority to GB Patent Application No. 1901596.5 filed 5 Feb. 2019, the entire contents of which is hereby incorporated by reference.

The present technique relates to the field of computing devices.

A computing device may be vulnerable to hackers who may use code vulnerabilities in device firmware or in the entire software stack installed on a given computing device to mount malicious attacks. To do so, the hacker may extract the raw software binary from a device and apply reverse engineering techniques to understand the software's content and possible vulnerabilities. To prevent reverse engineering of software on a device, the software may be stored locally in an encrypted form as well as being distributed in an encrypted form during over the air updates. This can reduce the opportunity for the attacker to be able to identify code vulnerabilities. However, when software encryption is used then this creates challenges in management of the decryption key for decrypting the software.

At least some examples provide a key injection method for a computing device having a secure execution environment and a less secure execution environment, wherein program code or data associated with the secure execution environment is isolated from access by program code executed in the less secure execution environment; the method comprising: providing a software decryption key for decryption of software to be run on the computing device, wherein the software decryption key is a class key shared between a class of devices including said computing device; using a key injection software component executed within the secure execution environment of the computing device, controlling storage of the software decryption key in a protected state in a key storage location accessible to the computing device; the protected state comprising a state in which the software decryption key is unreadable in the clear from the key storage location by an external device or by program code executed in the less secure execution environment of the computing device.

At least some examples provide a method for a computing device having a secure execution environment and a less secure execution environment, wherein program code or data associated with the secure execution environment is isolated from access by program code executed in the less secure execution environment; the method comprising: using a control software component running within the secure execution environment: obtaining a software decryption key stored in a key storage location in a protected state, the protected state comprising a state in which the software decryption key is unreadable in the clear from the key storage location by an external device or by program code executed in the less secure execution environment of the computing device; and using the obtained software decryption key, decrypting target software to be run on the computing device; wherein the software decryption key is a class key shared between a class of devices including said computing device.

At least some examples provide a method for providing an over-the-air update for target software to be run on a given class of computing devices; the method comprising: using a class key shared between said given class of computing devices, encrypting updated software for said target software; providing a control portion comprising at least: an encryption status indication indicating that the updated software requires decryption; and a key identifier for identifying the class key used to encrypt the updated software; and making a software update package available to the given class of computing devices, the software update package including the encrypted updated software and the control portion.

At least some examples may provide at least one computer program to control the device to perform the method of any of the examples discussed above. At least one storage medium may store the at least one computer program. The storage medium may be a non-transitory or a transitory storage medium.

At least some examples provide an apparatus comprising processing circuitry to perform data processing and data storage storing at least one computer program for controlling the processing circuitry to perform the method of any of the examples discussed above.

Further aspects, features and advantages of the present technique will be apparent from the following description of examples, which is to be read in conjunction with the accompanying drawings, in which:

FIG. 1 schematically illustrates an example of a computing device;

FIG. 5 illustrates a software update package including encrypted program code or data;

FIG. 6 shows examples of encryption parameters for controlling decryption of the software;

Figure 1:
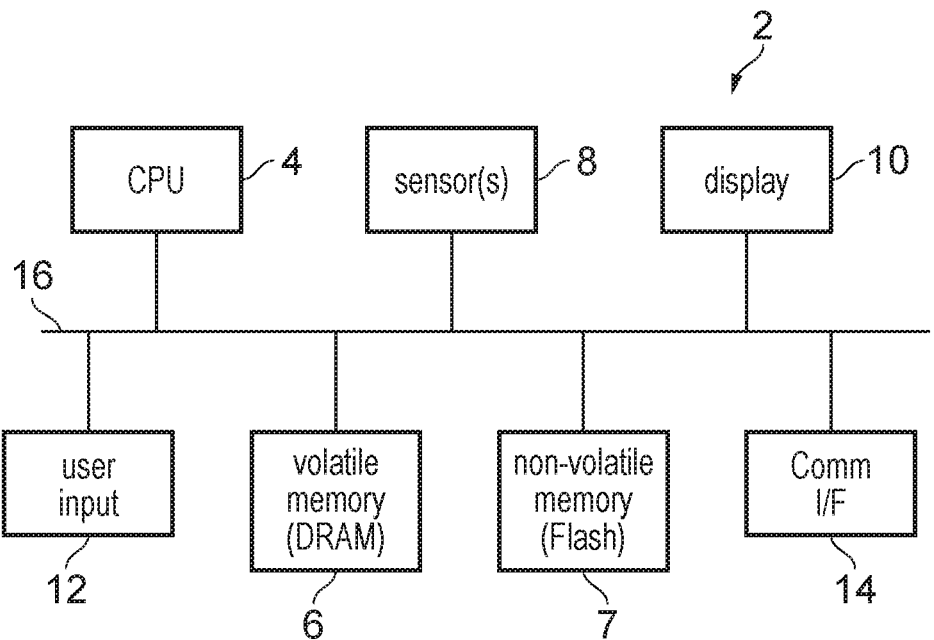

A technical challenge in implementing software encryption lies in management of the software decryption key to be used to decrypt the encrypted software to be run on a computing device. The device will need a key to be able to decrypt the software, but where does it obtain the key from, and how is this key shared between the party providing the software and the device itself, while maintaining security? Another consideration is that production time is a critical factor in the production line for producing computing devices cost effectively, so it is desirable that the measures introduced for provision of the key do not incur too much additional complexity during the production line.

In the key injection method described below, a key is injected into a computing device which has a secure execution environment and a less secure execution environment, where program code or data associated with the secure execution environment is isolated from access by program code executed in the less secure execution environment. A software decryption key is provided, for decrypting software to be run on the computing device, where the software decryption key is a class key which is shared between a class of devices including the computing device. A key injection software component executed within the secure execution environment of the computing device is used to control storage of the software decryption key in a protected state in a key storage location accessible to a computing device. The protected state is a state in which the software decryption key is unreadable in the clear from the key storage location by an external device or by program code executed in the less secure execution environment of the computing device.

This approach has several advantages. By using a class key as the software decryption key, which is shared between the devices of a given class, the same software binary can be provided to each of the devices of the class and there is no need to provide targeted software packages which are bespoke to each device. This makes over-the-air updates much more efficient for a software provider. Also, this makes the production line more efficient as the key injection mechanism can inject the same key for each device on the production line, and there is no need to incur extra overhead in secure management and distribution of individual software decryption keys per device.

Also, by using a key injection software component executed within the secure execution environment of the computing device to control the storage of the software decryption key in a protected state, this makes the method suitable for being performed by an original equipment manufacturer (OEM) who may be producing a class of computing devices which include devices made with integrated circuits or system-on-chips provided by two or more different chip manufacturers, as it means that the software decryption key used for each device can be independent of the particular chip manufacturer who manufactured the system-on-chip of that device.

An alternative would be that the chip manufacturer manufactures the integrated circuit to include a hardware element which securely retains the software decryption key, which is built into the chip hardware during manufacture of the integrated circuit itself. However, with this approach, either the software decryption key would need to be different for devices using integrated circuits manufactured by different manufacturers, or there would need to be communication of a common key between the OEM and the chip manufacturers. If different chip manufacturers embed different keys, this would complicate distribution of over-the-air software updates as different update packages would be needed for each set of devices based on an integrated circuit from a different chip manufacturer. If an OEM had to share a common key with each chip supplier (either by the OEM transmitting the key to the chip supplier, or with the chip supplier supplying the key to the OEM), so that a class of devices including system-on-chips (SoCs) manufactured by different chip manufacturers could all share the same software decryption key to make subsequent over-the-air updates more efficient, this sharing of the key between the OEM and the chip supplier may provide an avenue for a hacker to intercept the key and in any case this may complicate the production line at the chip supplier, where a batch of chips being manufactured may need to be injected with different keys supplied by different OEMs, again increasing the cost of manufacturing the device. In general, the cost of manufacture increases if the production line needs to provide bespoke keys for a number of subsets of devices within a given batch, as compared to providing the same key for all devices in the batch. Especially for lower cost devices such as personal fitness watches, low cost sensors, or other relatively power-constrained or area-constrained devices such as those proposed for use in the Internet of Things, such increased production costs may not be justified making it difficult to efficiently support software encryption on such devices.

Another approach would be that fuses built into the system-on-chip by the chip manufacturer may be programmed by the OEM to inject a key into the secure hardware. However, a problem with this approach is that such fuses typically have very little storage capacity, and often this capacity is already used for other purposes. Also, the particular steps needed to program the fuses may be different per SoC design, again creating a fragmentation of the OEM manufacturing process and hence higher integration cost than may be justified for some types of device.

Instead, by using a key injection software component executed within the secure execution environment of the computing device, this avoids the need for specific keys to be embedded in the SoC by the chip supplier, thus enabling an OEM (who is integrating the SoC with other components to form a computing device) to perform key injection while sharing the same key between a class of devices, which may include devices based on SoCs supplied by different chip manufacturers. This approach also makes the key injection method more suitable for environments where the chip manufacturer and the party providing software for execution on the computing device are different operators, rather than a single party having control over a closed system including both the underlying integrated circuit and the software stack executing on the device.

The software decryption key is stored in the key storage location in a protected state which protects the key against access by an external device or by program code executed in the less secure execution environment. This protected state can be implemented in different ways.

In one example, the protected state is a state in which the software decryption key is encrypted based on a device key which is private to the computing device and is inaccessible to the program code executed in the less secure execution environment. For example, the device key could be a key embedded in the integrated circuit design by the chip manufacturer during manufacture of the system on chip. Unlike the software decryption key, the device key does not need to be known outside the device because it will not be used for encryption of the software itself by the software supplier. Instead the device key is used for protection of the software decryption key once the software decryption key has been injected. The decryption of the software decryption key using the device key may be controlled by a component running in the secure execution environment to the device, to protect against interception of the unencrypted software decryption key by an external device or by potentially insecure software executing on the device in the less secure execution environment. The device key could be used directly as the decryption key for decrypting the software decryption key, or a further key derived from the device key could be used to decrypt the software decryption key.

With this approach, it is not necessary for the key storage location to be a location which is inaccessible to the external device or to program code executing the less secure execution environment. As the software decryption key is protected by encryption based on the device key, the software decryption key can be stored in the encrypted form within a potentially insecure storage location, such as a region of memory of the computing device which is accessible to less secure code executing in the less secure execution environment, or an external storage location such as an unprotected flash memory or a hard drive or in a remote location accessible in the cloud from the computing device via a network. The provision of a two-level key structure with a device private key being used to protect a class key used as a software decryption key, and the software decryption key being used to decrypt software to be run on the device, enables a better balance between security and ease of manufacture on the production line for the reasons discussed above.

Alternatively, another way of implementing the protected state may be that the software decryption key is stored in a storage region which is accessible to program code executed in the secure execution environment, but inaccessible to an external device or to program code executed in the less secure execution environment. Hence, with this approach it is possible to store the software decryption key in the clear as it is not possible for code other than code executed within the secure execution environment to access the key. For example with this approach the storage location could be a region of non-volatile memory isolated for access by the secure execution environment. For example, some hardware processor architectures may have features designed for policing accesses to non-volatile memory so as to prevent access to designated secure regions of non-volatile memory by code executing in the less secure execution environment.

When the software decryption key is stored in the protected state, the software decryption key may be unreadable in the clear by a software component other than a predetermined control software component of the secure execution environment and the key injection software component. For example, the computing device may support storage of secure objects which are stored in association with an identifier of a particular software component which is allowed to read or decrypt the secure object. This identifier may be set such that only the predetermined control software component or the key injection software component is able to read the software decryption key in the clear. In some implementations, the key injection software component itself may also be unable to read the software decryption key in the clear once it is has been stored to the key storage location. For example the key injection software component may be able to perform the encryption of the software decryption key based on the device key, but may be unable to decrypt the encrypted key. This provides added security as it means that software components executing the secure execution environment other than the predetermined control software component cannot obtain the key in the clear. The predetermined control software component could for example be a part of a trusted operating system for managing trusted applications running in the secure execution environment.

As mentioned above, the key injection method may be performed by an original equipment manufacturer (OEM) of the computer device, where the computing device comprises a system-on-chip manufactured by a different manufacturer to the OEM. The software decryption key may be independent of the manufacturer of the system-on-chip. Hence even if the OEM is manufacturing computing devices with SoCs provided by two or more different chip manufacturers, the same software decryption key can be used for each of those devices. The key injection method may be performed within a secure or trusted environment, such as the factory of the OEM. Alternatively, even if the OEM desires that devices with SoCs provided by different chip manufacturers should have different software decryption keys, an advantage of the key injection method described above is that the key selected for each class of device can be selected independent of the chip manufacturer, and does not need to be shared with the chip manufacturer, which improves security.

When the computing device, with the software decryption key injected in it, is released for in-field use, an in-field software image provided on the computing device at the point of release for in-field use may exclude the key injection software component. Hence, as the key injection software component may only appear in the factory software image installed on the device within the factory and the key injection software component is removed prior to release for in-field use, this prevents further software decryption keys being injected after the device is being released into the field, and may prevent existing software decryption keys being overwritten by the key injection software component. This helps to maintain security of encrypted software.

Alternatively, another way of preventing injected keys being manipulated may be that the key injection software component may be prohibited from overwriting a previously injected software decryption key. With this approach it may still be possible for the key injection software component to be included in the in-field software image, as even if it was subsequently executed once the device is in the field, any previously injected software decryption keys would be unaffected and so can still be used to protect subsequent over-the-air software updates.

The software decryption key may be stored in the protected state in association with a key identifier which distinguishes the software decryption key from other software decryption keys. This enables different keys to be used to protect different pieces of software to be installed on the same device. This can improve security, for example when different parts of the software on the device are to be provided by different software suppliers, in which case it may be undesirable to share the same software decryption key among each of those software suppliers. Even if all the software to be protected by encryption comes from the same supplier, it may still be desirable to support multiple different keys to reduce the vulnerability of attack by limiting which parts of the software would be exposed if any individual key is leaked. Hence, in some examples two or more software decryption keys can be injected, associated with different key identifiers, each stored in the protected state under control of the key injection component running in the secure execution environment.

The software decryption key could be passed to the key injection software component during key injection by further key injection software which runs in the less secure execution environment of the device. If the key injection method is performed within a secure environment such as an OEM factory then it may be considered sufficiently secure to allow a component running in the less secure execution environment to handle the passing of the key to the secure key injection software component running on the secure execution environment, although it is the secure key injection software component that controls the storage of the software decryption key in the protected state (e.g. based on encryption of the key using the device private key as discussed above). By performing some of the key passing steps using a further key injection software component running in the less secure execution environment, this can reduce the complexity of the secure key injection component which may increase security. For example, steps of communicating with a server, creating a secure connection with the server, exchanging messages with the server, or generation of keys for protecting the communication channel with the server, are just some examples of steps which could be handled by the further key injection software component, to reduce the complexity of the key injection software component itself. Also, the key injection method may be designed to reduce the number of components that can create errors and delays, such as network connection, key generation, remote processing and exchange of messages. For example, once the software decryption key has been obtained, no further communication with a remote device may be needed as the other steps of injecting the software decryption key into the device in the protected state may be performed locally on the device.

In the present application, the term "software" is used to refer not only to the program code for the software, but also to related data which may be provided as part of the software binary when the target software is installed.

A corresponding method is provided for decryption of software installed on a target device based on the software decryption key discussed above. Again, the computing device has a secure and less secure execution environment. A control software component running within the secure execution environment is used to obtain the software decryption key stored in the key storage location in a protected state, and using the obtained software decryption key, the control software component decrypts the target software to be run on the computing device. The software decryption key could be used to directly decrypt the target software, or alternatively the software decryption key could be used to derive a further key and then the derived further key can be used to decrypt the target software. Again, the software decryption key is a class key shared between a class of devices including the computing device. Hence, by using a software component running within the secure execution environment to obtain the software decryption key and remove any protection such as encryption and then to decrypt the target software, this protects the key against unauthorised access by an external device or potentially insecure code running in the less secure execution environment which could be used by an attacker in an attempt to circumvent the protection provided for the software using the encryption. By using a class key as the software decryption key this avoids the need for device specific software update packages to be provided to each member of the class.

The software decryption key may be stored in a protected state within a software-writeable storage location accessible to the computing device. Hence it is not necessary to provide some read-only hardware element for protecting the key, which helps reduce the cost of manufacturing the device and also means that it is practical for a party other than the integrated circuit manufacturer to perform the key injection method as discussed above.

As mentioned above, the protected state may comprise a state in which the software decryption key is stored in encrypted form based on a device key which is private to the computing device and is inaccessible to the program code executed in the less secure execution environment. Hence, the control software component may control decryption of the software decryption key based on the device key. As the control software component is run within the secure execution environment this protects against leakage of both the device key and the software decryption key. The combination of a device-specific key which is private to the computing device (it is not known outside of the computing device) and a class key used for the software decryption, which is protected based on the device key, provides a good balance between security and ease of implementing the production line for device manufacture. The key storage location used to store the key may be a location accessible to program code executed in the less secure execution environment, since protection against access to the code in the clear by the less secure code may be provided by the encryption of the software decryption key raised on the device which is inaccessible to the secure code.

When decrypting the software decryption key, the control software component may copy the software decryption key in encrypted form from the key storage location to a second storage location which is inaccessible to the program code executed in the less secure execution environment and then may decrypt the software decryption key in place within the second storage location. The device-specific key used to decrypt the software decryption key may also be stored within this second storage location. By decrypting in place within a region of memory which is inaccessible to the less secure execution environment, this prevents attackers seeing the decrypted version of the software decryption key.

The target software may be associated with a control portion (e.g. a header or footer) which may include information for controlling the decryption of the software. The control portion could include a number of pieces of information, for example including an encryption status indication which indicates whether the target software requires decryption. Not all software to be run within the secure execution environment may require encryption and so by providing a flag or other indicator (such as a version number) in the control portion of the software this can allow the control software component of the device to distinguish whether decryption is required or not. This can also help distinguish newer software designed for use with the software decryption from legacy software distributed in the clear. The control portion of the software may be supplied in the clear so that it does not itself need decrypting in order to be read.

In another example the control portion could specify a key identifier for identifying which software decryption key is to be obtained for decrypting the target software. This helps support the use of different software decryption keys for different portions of software to be run on the device, which can help to limit the effects of a key leakage and/or allows software supplied by different providers to be encrypted with different keys.

Alternatively, another way of supporting use of multiple different keys for decrypting different software components can be that a requesting software component executed in the less secure execution environment may supply the control software component with the specific software decryption key required for decryption of the target software, with that software decryption key being supplied in encrypted form by the requesting software component. With this approach, it could be a component in the less secure execution environment which is responsible for providing the appropriate key for the given piece of software to be run. In this case, the control software component running in the secure execution environment does not need to track any key identifiers for distinguishing which particular key is to be used for decrypting the target software, and the software would not need to have a control portion specifying an identifier of the related software decryption key. For example, a request for execution of a given software module within the secure execution environment, which is made by a component in the less secure execution environment, could be accompanied by the encrypted software decryption key itself.

The control portion of the target software could also include information specifying at least one encryption parameter for controlling the decryption of the target software. Hence the decryption of the target software may be dependent not only on the software decryption key but also on the at least one encryption parameter specified in the control portion. For example, the at least one encryption parameter could include an identifier identifying which encryption algorithm type is used (e.g. AES, or AES-GCM). Also, the at least one encryption parameter could specify constants or parameters to be used in the encryption algorithm, such as a nonce (value to be used once) which provides freshness in encryption and may be different for each version of software encrypted using the same class key, or another value such as a tag value which is a value used specifically in the AES or AES-GCM encryption algorithms. It will be appreciated that the particular encryption parameters to encode within the control portion of the target software may be specific to the particular type of algorithm used, and so could vary from implementation to implementation.

Alternatively, rather than encoding the encryption parameters within a header or other control portion of the target software package itself, the at least one encryption parameter could also be communicated between the software provider and the device in other ways, such as by separate communication with the encryption parameters then being stored locally on the device separate from the target software itself.

The software decryption key may be a symmetric key. Hence it is not necessary to use asymmetric cryptography for the software encryption and decryption.

Startup of the target software following decryption may be dependent on successful verification of a signature associated with the target software. While the encryption of the target software provides confidentiality to protect against an attacker being able to reverse engineer information about the target software, it does not provide authenticity (a guarantee about who is the party providing the software). For some applications, it may be important to trust that the software has come from an authorised source, which can be verified based on the signature. For example, the signature may be derived from the target software using a private key which is known only to the particular trusted provider and then on receipt of the target software the control software component on the computing device may verify the signature, for example using a public key associated with that trusted provider, to check whether the software has indeed originated from the expected provider. In some decryption algorithms, such as AES-GCM, the signature verification may be an integral part of the algorithm so that the performance of the decryption algorithm also includes verification of the signature. For other types of decryption algorithms which do not include signature verification, the signature can then be verified in a separate step, either before or after decryption. In some examples the signature may itself be part of the encrypted bundle of information associated with the target software, so that the signature itself may require decryption prior to being verified.

Alternatively, the signature could be sent in unencrypted form and in this instance the signature verification could occur prior to decryption. Alternatively, signature verification can be performed in parallel or as part of a single combined algorithm.

In cases where the control portion includes an encryption status indication indicating whether the target software requires decryption, and the signature covers the control portion, then when the encryption status indication does indicate that the target software requires decryption, the signature verification may be based on a version of the control portion in which the encryption status indication has either been removed or updated to indicate that the target software does not require decryption. This can be useful because it means that the signature can be the same regardless of whether decryption is applied or not and also it is possible to include the signature within the encrypted portion of the target software as even if the encryption status indication is subsequently set when the code/data and signature of the target software is encrypted, this does not require recomputation of the signature.

The use of encryption based on a class key as discussed above can be applied to any software to be executed on the computing device. However it is particularly useful for target software which is to be executed within the secure execution environment, which may have a greater security requirement.

This method enables the target software to be updatable through over-the-air update, with both the transmission in the over-the-air (OTA) update and the subsequent storage of the updated software on the device being protected by encryption.

The decryption of the target software may occur at different timings depending on the particular implementation chosen. In some cases, the decryption could be applied as soon as the over-the-air update package is received, if it can be guaranteed that the subsequent decrypted target software can be securely stored on the device within the region of memory which is inaccessible to external devices and to less secure code operating in the less secure execution environment.

However, in other examples it may be preferred that initially the software is stored in the encrypted form until the point when it is to be booted or executed, at which point the encrypted software may be copied into a secure region of memory which is isolated from access by the less secure execution environment, and then decrypted under control of the control software component running within the secure execution environment.

In another corresponding method, a method is provided for providing an over-the-air (OTA) update for target software to be run on a given class of computing devices. The software is encrypted using the class key shared between the given class of computing devices. A control portion is provided comprising at least an encryption status indication indicating that the updated software requires decryption, and a key identifier for identifying the class key used to encrypt the updated software. A software update package is then made available to the given class of computing devices which includes the encrypted updated software and the control portion. Hence, this promotes support for different software update packages to use different class keys and then the device receiving the package can identify from the encryption status indication that decryption is required and from the key identifier which particular key is to be used to decrypt the updated software.

The class key used for encrypting the updated software may be the same as the class key used to encrypt a previous version of the updated software. Hence it is not necessary to cycle or update keys on each subsequent iteration of the same piece of software. This is useful because it means that only a single key for software decryption needs to be injected during manufacture for supporting use of a given piece of software even if the software is updated, which simplifies the production line for computing devices.

As well as the encryption status indication and the key identifier, the control portion may also specify at least one encryption parameter for use in a decryption algorithm for decrypting the updated software using the class key. For example, as described above the at least one encryption parameter may include an identifier of the decryption algorithm type to use and/or constants for use in the decryption algorithm.

The software update package may also include a signature attesting to a source of the software update package. The signature may be part of the encrypted portion of the software. The signature may be generated by deriving the signature from at least a portion of the software code and data (and optionally also the control portion) using a private key associated with an attestable identity, such that the signature can then be verified as coming from the attested source by verifying the signature and the software update package based on a public key associated with that attested identity. For example a certificate chain based on asymmetric cryptography can be used to verify the signature. The signature may be generated based on an unencrypted version of the updated software, prior to encrypting the updated software using the class key.

All of the methods discussed above may be implemented in software using at least one computer program which controls a device to perform these methods. The computer program may be stored on a storage medium. The storage medium may be a non-transitory storage medium.

FIG. 1 schematically illustrates an example of a computing device 2, e.g. an electronic device. The computing device could be, for example, a mobile telephone or tablet computer, a laptop or other processing device, or a smaller-scale device such as a smart watch, personal fitness/health tracker, or other devices in the Internet of Things, such as a temperature sensor within a heating or air conditioning system, an actuator for controlling street lighting, etc. It will be appreciated that these are just some examples of possible uses of the computing device.

The computing device 2 has processing circuitry (e.g. a central processing unit, CPU) 4 and storage circuitry (memory) 6, 7 for storing data and program code executed by the processing circuitry 4. In this example the memory includes volatile memory (e.g. DRAM) 6 and non-volatile memory (e.g. flash memory) 7. The device may also have one or more sensors 8 for sensing external conditions such as temperature, pressure, infrared radiation, etc., a display 10 for displaying information to a user, a user input module 12 for accepting input gestures from a user, and a communications interface 14 for communicating with other devices, for example through wireless protocols such as Wi-Fi, Bluetooth, or NFC or through wired communication such as Ethernet. The various components 4-14 of the device 2 communicate via at least one bus 16. It will be appreciated that FIG. 1 is just one example of a possible configuration of the device 2 and other examples may have many other components not shown in FIG. 1. Also not all of the components shown in FIG. 1 need to be included. For example some devices may not need any sensors 8 or if they do not interact directly with a user may not need a display 10 and/or user input 12.

Figure 2:
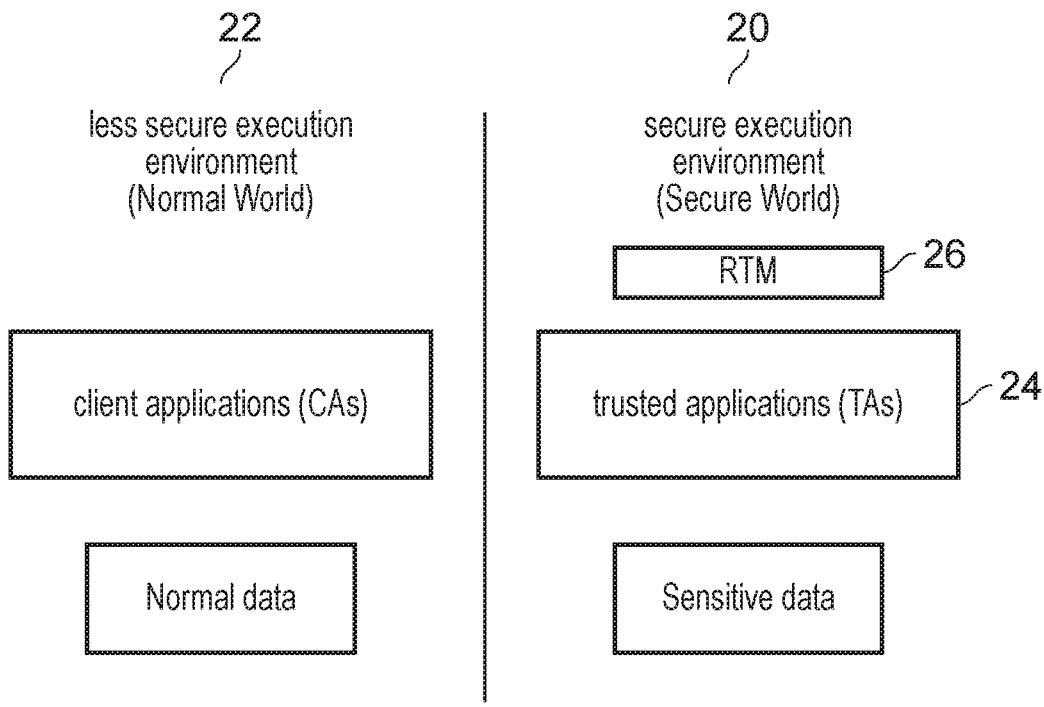
FIG. 2 illustrates a secure execution environment and a less secure execution environment.

As shown in FIG. 2, the processing circuitry 4 and other components of the device may have a hardware architecture which provides for a secure execution environment 20 and a less secure (normal) execution environment 22 which coexist on the device. Software applications and data may be associated with one of the secure or less secure execution environments, and application code or data associated with the secure execution environment 20 is isolated from access by the code executed within the less secure execution environment 22. This may be implemented using hardware architecture features, such as using a memory management unit which may define a partition of memory address space into secure and less secure regions, and may enforce memory protection so that access requests issued by an application executed in the less secure execution environment 22 are not permitted to read/write a region of the memory address space that is restricted for access by the secure execution environment 20. In some examples, only the volatile memory unit 6 may be partitioned into the secure and less secure regions and have its access policed by the memory management unit. In such examples the non-volatile memory 7 may be considered entirely associated with the less secure execution environment. Alternatively, other approaches may also partition the non-volatile memory 7 into secure and less secure regions and prevent less secure code accessing data stored in the secure region in the non-volatile memory. Other security mechanisms that can be provided to protect the assets associated with a secure environment 20 may be to provide for encryption of any data which may need to be paged out of the secure regions of memory to a potentially insecure location such as an external device (or in the flash memory 7 if this is not within the secure boundary of the secure execution environment 20). The secure execution environment 20 may be a trusted execution environment (TEE). The isolation of the secure execution environment 20 from the less secure execution environment 22 could in some examples be controlled according to the TrustZone® architecture provided by Arm® Limited of Cambridge, UK. Other architectures for providing TEEs are also known.

A secure operating system running within the secure execution environment 20 may control the execution of trusted applications 24 within the secure execution environment 20. The secure operating system may include a runtime manager 26 which may act as a control software component for handling certain tasks such as decryption of trusted applications and unwrapping of protected keys as discussed below.

Figure 3:
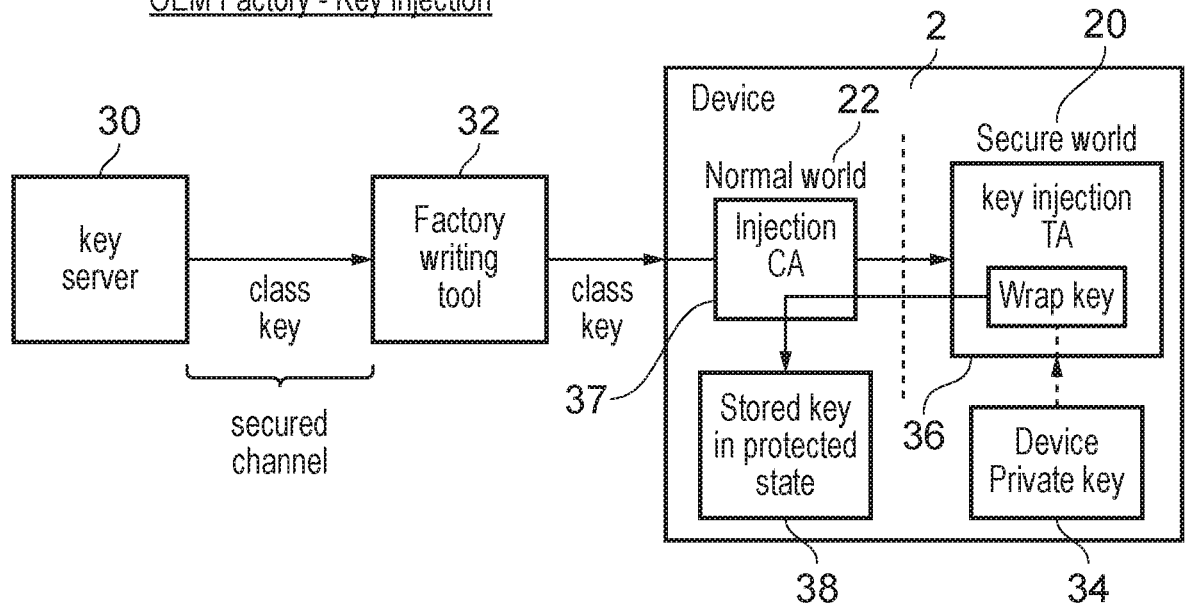
FIG. 3 illustrates key injection of a class key to be used for decrypting software on the device.
Figure 4:
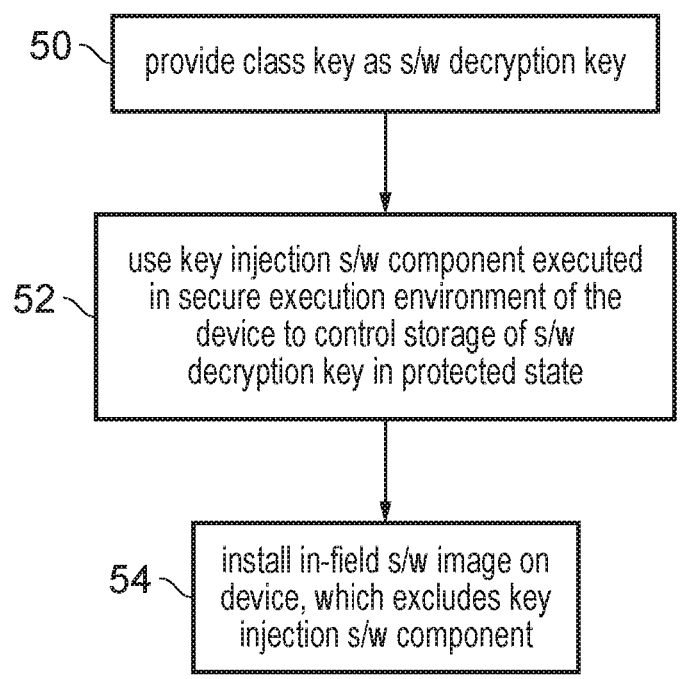
FIG. 4 illustrates a method of injection of the key.
Figure 7:
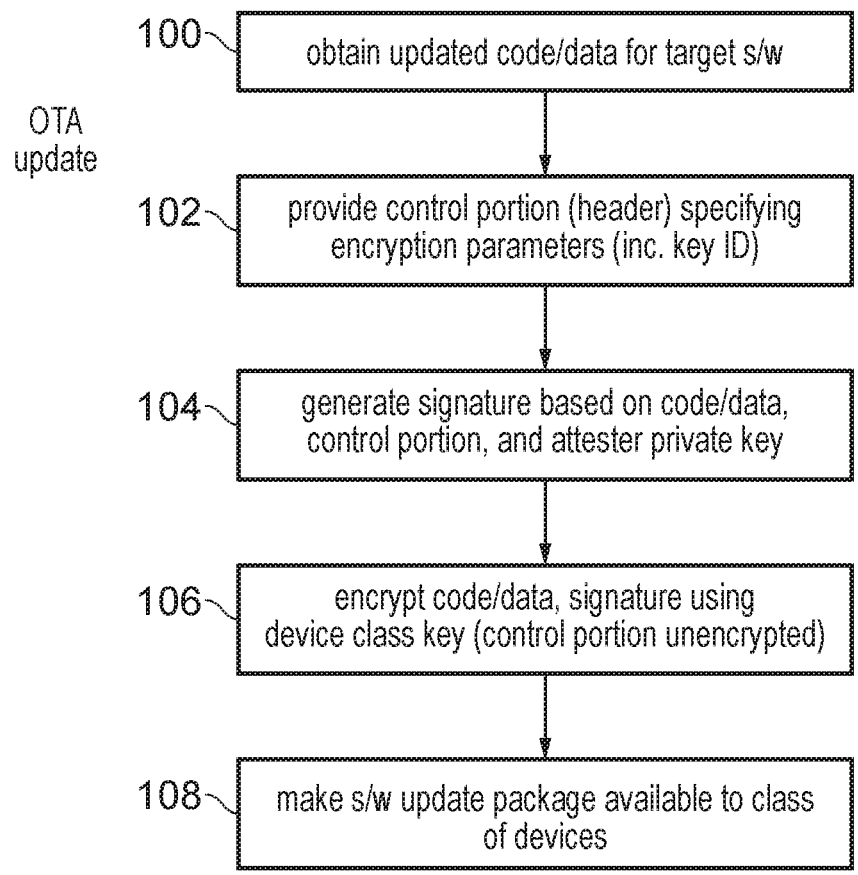
FIG. 7 shows a method for providing an over-the-air update for target software to be run on a given class of computing devices.
Figure 8:
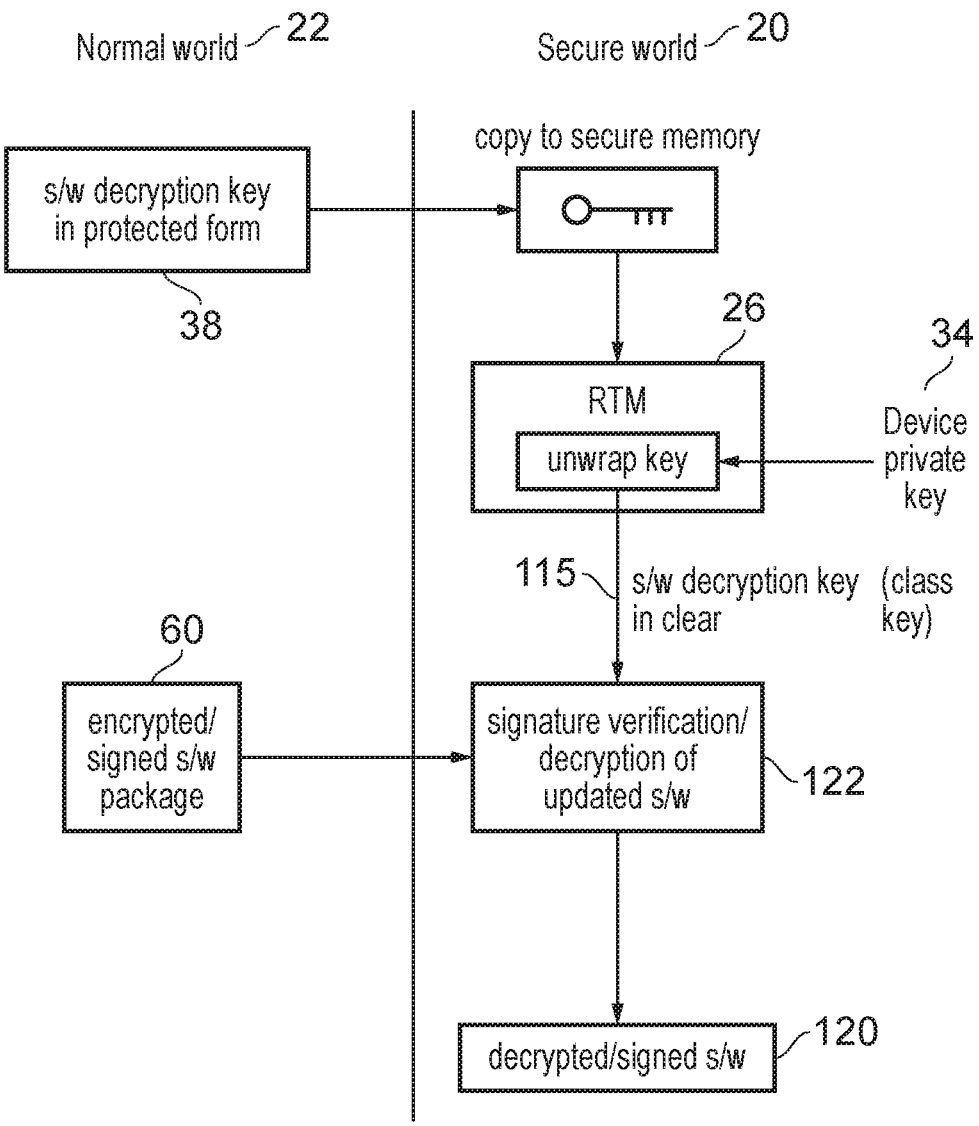
FIG. 8 shows decryption of software on the device.
Figure 9:
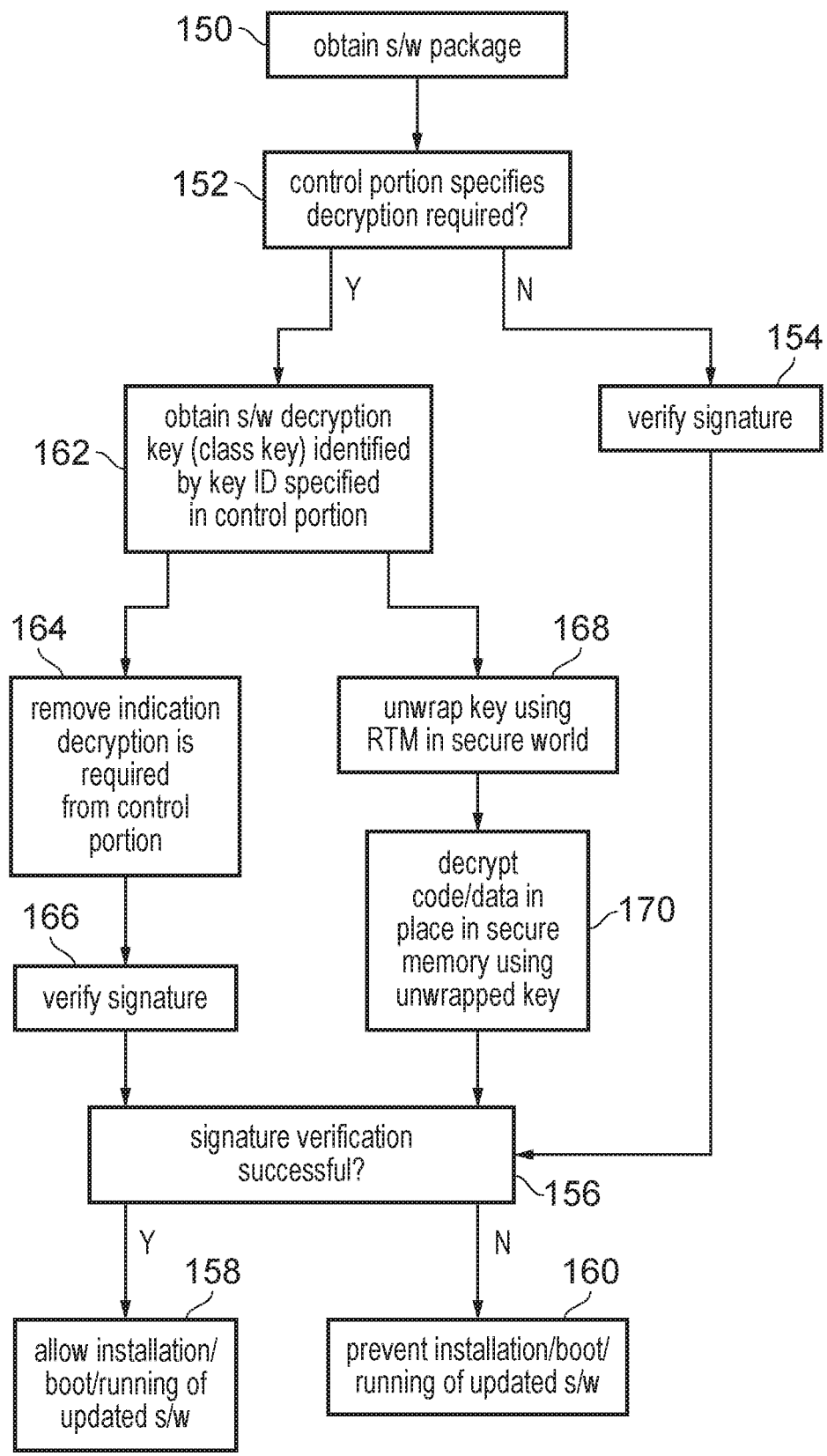
FIG. 9 shows a method of controlling decryption of the software.

In the examples discussed below, trusted applications 24 to be executed within the secure execution environment 20 of the device 2 are encrypted using a symmetric device-class key, so that the trusted application code's confidentiality is maintained both on the device flash memory 7 and during over-the-air updates. The symmetric key is injected to the device in the trusted execution environment 20 during production and is itself encrypted using a per-device secret key that does not leave the device (it is private to the device). On booting of the device, first the encrypted decryption key is loaded into memory restricted for access in the trusted execution environment 20, then the decryption key is itself decrypted using the per-device secret key and then the decrypted decryption key is used to decrypt the encrypted trusted application 24 so that the trusted application can be run. This approach is supported through three complementary functions as described in the subsequent figures. FIGS. 3 and 4 show injection of the software decryption key in the factory during device manufacturing. FIGS. 5 to 7 illustrate generation of encrypted application's software for distribution to the device. FIGS. 8 and 9 illustrate decryption of trusted application software 24 before starting it on the computing device 2.

Hence, with reference to FIGS. 3 and 4, the device production may include a step of key injection which may be performed by an original equipment manufacturer (OEM) within their secured factory environment. The OEM may be a manufacturer of computing devices who does not themselves manufacture their own integrated circuits or system-on-chips for the processing hardware of the device, but integrates chips made by a separate chip manufacturer into an overall computing device together with other components such as the display 10, user input 12, communications interface 14, etc. Such an OEM may be manufacturing a batch of devices which may include devices with different system-on-chips manufactured by different chip providers, but nevertheless for production efficiency it is useful to use the same key injection method for each of the devices in the batch, with keys selected independent of which chip manufacturer provided the system-on-chip for an individual device.

As shown in FIG. 3, a class key associated with the class of devices to be manufactured is obtained from a key server 30, which could be maintained locally within the OEM factory or could be a remote server, and the key is provided to a factory writing tool 32 which controls the device 2 to start up with a factory software image being booted on the device, and the factory software image including software components including a key injection client application (CA) 37 and key injection trusted application (TA) 36 for running in the less secure and secure execution environments 22, 20 respectively. The communications channel between the key server 30 and factory writing tool 32 may be secured in any known manner for protecting communications, for example a channel may be secured based on asymmetric key cryptography, or a physically secure channel may be used.

The class key (software decryption key) injected by the factory writing tool 32 is provided to the key injection CA 37 running within the less secure execution environment 22 of the device 2. In some examples, the class key may be encrypted with a temporary factory key at the time of injection into the device 2, where that temporary key is inaccessible to code executing in the less secure execution environment 22, and accessible to the key injection TA 36 in the secure execution environment. In this case, the key injection TA 36 decrypts the class key using the temporary factory key, before proceeding to perform a key wrapping process for protecting the class key against inappropriate access when it is subsequently stored in the device when it leaves the factory.

The device 2 has previously been provided with a device private key 34 which is accessible only to code executing within the secure execution environment 20, and which is private to (not known outside of) the device 2. For example, during manufacturing of the system-on-chip for the device 2, the chip manufacturer could have injected a device-specific key and then discarded the injected key without ongoing storage of that key, or alternatively the chip manufacturer could have controlled a random-number generator in the device to generate the device-specific key in a way which means the key is never known outside the device, even to the chip manufacturer. The device private key 34 may vary from device to device within a batch of devices being manufactured by the OEM, even among devices based on SoCs from the same chip manufacturer.

The device private key 34 is used by the key injection component 36 to perform a key wrapping process which encrypts the received class key using the device private key 34 to generate a secure object. Alternatively, the key wrapping process could be performed, on request by the key injection component 36, by a further secure component executed in the secure execution environment 20, such as the RTM 26 or a dedicated cryptographic driver. This allows the wrapped key to be stored in a protected state within normal world memory, such as within an unprotected region of the flash memory 7, or at a remote key storage location accessible via the communications interface 14 of the device. As the key is protected by encryption based on a device private key 34 which never leaves the device 2, then even though the key storage location may be insecure, the key cannot be read in the clear by unauthorised software. The use of the device private key 34 binds the wrap key to one particular hardware device so that even if the stored key in the protected state is leaked and copied to another device, another device will not have the same device private key 34 and so cannot access the software decryption key in the clear.

The key wrapping mechanism provided by the key injection trusted application 36 may be such that, in addition to encryption based on the device private key 34, the wrapped key is bound to an application identifier of one or more applications allowed to decrypt the wrapped key, so that in subsequent in-field use of the device 2 only certain applications which are able to provide the specified identifier are able to decrypt the software encryption key which is stored in the protected state. The specified identifier could be an identifier of the run time manager (RTM) 26 shown in FIG. 2, or alternatively the specified identifier could be an identifier of the key injection TA 36 itself, and in this case the run time manager (RTM) 26 may have a capability to impersonate the identity of any other trusted application running within the secure execution environment 20 so that the RTM 26 is able to supply the unique application ID of the key injection TA 36 when needing to decrypt the protected key using the device private key 34. In some implementations the key wrapping may be performed by a cryptographic driver or by the RTM 26, separate from the key injection TA 36 itself. Since the Crypto Driver or RTM 26 is another entity from the key injection TA 36 calling the key wrapping process, it can enforce rules based on the identity of the caller. That way, it can bind the secure object to a specific unique application ID, such that only the TA with that UUID (or the RTM 26 which can emulate another TA's ID) can unwrap the key. Also, a TA can request 'delegated wrapping', specifying a target UUID, such that the calling TA itself cannot unwrap the secure object, but instead another application identified by the target UUID is the application allowed to unwrap the secure object. Hence, by binding the wrapped key to a restricted subset of applications allowed to unwrap the key, this improves security.

Any encryption algorithm may be used during the key wrapping process for encryption process, for example the wrapping may use HMAC-SHA-256 for key derivation and authentication and could use AES encryption for confidentiality. The encryption may include a random buffer to prevent oracle attacks. If the application ID of the key injection TA 36 is used to bind the wrapped key, then the key injection TA should have an application ID which is not used by any other application.

FIG. 4 shows a method for performing the key injection process. At step 50 a class key is provided as a software decryption key for injecting into a device. At step 52 a key injection software component 36 executed in the secure execution environment 20 of the device 2 is used to control storage of the software decryption key in a protected state. While in the example of FIG. 3 the protected state is a state in which the key is encrypted based on the device private key 34, another option could be that the key is stored to a secure region of non-volatile memory 7 which is inaccessible from external devices or from code executing the less secure execution environment 22.

Having injected the key and stored it in its protected state, then at step 54 an in-field software image is installed onto the device, which provides the system firmware which is to be provided on the device at the point when it is released for in-field use. The in-field software image may be designed to ensure that in-field devices are not able to modify software decryption keys injected onto the device in the factory, which could otherwise risk bricking the device if critical code needed for the device to function can no longer be decrypted because the relevant software decryption keys have been modified. In the example of FIG. 4, this is achieved by excluding the key injection TA 36 from the in-field software image, so that it is no longer possible to inject and wrap software decryption keys 38 once the device has been released for in-field use. Hence the key injection component 36 may be included only in the factory software image which is temporarily installed in the device for the purpose of handling the key injection when the device is in the secured environment of the OEM factory. Alternatively, the key injection TA 36 could be included in the in-field software image, but may have code which is unable to overwrite existing software decryption keys 38 which have already been injected, which again provides protection against modification of keys needed for correct functioning of critical device software.

FIG. 5 illustrates an example of a software binary package 60 which may be provided installed on the device Flash memory 7 when the device is first released for in-field use, or which may be provided in a subsequent over-the-air update. The software package 60 relates to a TA 24 or other system firmware to be executed within the secure execution environment 20. The software package 60 includes code and/or data 62 associated with the updated software, as well as a control portion 64 which provides information indicating how the code or data is encrypted. This example of the control portion 64 includes a header as well as a set of encryption parameters which are provided at location with an address identified by an offset (encrypt_params offset) identified within the header 64. It will be appreciated that in other examples the encryption parameters could be specified within the header itself or in a different part of the software update package. Also the software update package includes a signature 66 used to verify authenticity of the source of the software update package as well as a public key 68 associated with the attested party for verifying authenticity of the signature 66.

When generating the software binary package 60, the header portion 64 and the code/data 62 are signed based on a private key corresponding to the public key 68, to generate the signature 66. For example, the signature may be generated according to RSA-PSS using the SHA-256 algorithm and a 256-bit random salt. The signature is based on a value of the header 64 in which a flag specifying that the code/data is encrypted is temporarily set to indicate that no encryption is applied.

Then, a bundle of information including the updated code and data 62, the public key 68 corresponding to the private key used to generate the signature, and the signature 66 itself, are encrypted based on the shared class key which was injected into the relevant class of devices using the key injection method shown in FIGS. 3 and 4, which is known to the party providing the software update package. In the case when the updated software is provided by the same organisation that implemented the OEM key injection processors shown in FIG. 3, then security of the class key can be guaranteed by not leaking the key outside of that organisation. In cases where the software provider is separate from the OEM, any known method for securing a communication channel can be used to protect distribution of the key from the OEM factory to the software provider (e.g. use of a physically secure channel or a channel protected by asymmetric key cryptography based on a further private-public key pair). Alternatively, in some cases the class key could have originated from the software provider in which case the secure channel could be used to distribute the key from the software provider to the OEM before the devices were manufactured.

The encryption of the information 62, 66, 68 is performed based on encryption parameters 65 which are referenced by the header 64. FIG. 6 shows two alternative ways of encoding the encryption parameters. For example in the upper example of FIG. 6, the encryption parameters may specify a header version which in this case implies that some default encryption algorithm is used, for example AES-GCM with a 128-bit key, 96-bit nonce and 128-bit tag. The tag 69 and nonce 70 for the encryption are encoded within the encryption parameter 65. The nonce 70 is changed whenever either the code/data 60 of the software or the class key used to encrypt the software is changed, and signalled in the encryption parameters 65 accompanying the software.

Alternatively, as shown in the lower example of FIG. 6, the encryption parameter 65 could also specify further parameters such as a key identifier 71 and algorithm identifier 72 in addition to a tag 69 and nonce 70. The algorithm identifier 72 allows a number of different types of encryption algorithm to be supported, so that different encryption algorithms could be used for different software packages 60, without restricting the software provider to use a certain default algorithm as in the upper example of FIG. 6. The key identifier 71 similarly allows different class keys to be used for different pieces of software. The version identifier 73 included at the start of the encryption parameters or within the header 64 may identify which form of the encryption parameters is expected and also may implicitly identify whether or not the provided code/data 62 is encrypted or not. Alternatively another example is the header 64 could include a flag which specifies whether or not the encryption is applied or not, in addition to the offset to the encryption parameter 65.

In implementations where a key ID 71 is supported then at the point of key injection when the key is wrapped by the key injection trusted application 36 as shown in FIG. 3, the key may be bound to its associated key identification value which is saved in the protected secure object 38 along with the key itself. The key ID is stored unencrypted in the wrapped object. This allows the device on decryption of the target software to locate the appropriate key for decrypting that software.

FIG. 7 shows a flow diagram illustrating a method of generating a software update package for performing an over-the-air software update for trusted software on an electronic device 2. At step 100 updated code and/or data 62 for the target software is obtained. At step 102 a control portion 64 is provided associated with the updated code/data 62 which specifies encryption parameters for controlling encryption and decryption of the code/data. The control portion may optionally include a key identifier 71 as discussed above, as well as a flag or version number specifying whether or not the software is to be encrypted. At step 104 a signature is generated based on the code/data 62, the control portion 64 and attester private key associated with the trusted party whose identity is to be authenticated based on the signature. In cases where the control portion specifies a flag indicating whether the software is to be encrypted, then this flag may temporarily be cleared prior to generating the signature.

At step 106 the code/data 62, the signature 66 and optionally the public key 68 for verifying the signature may be encrypted using a device class key which has previously been injected into each device of the appropriate class as well being shared with a software provider. The control portion 64 including the encryption parameters 65 remains unencrypted. While in the example of FIG. 5 the RSA public key 68 used to verify the signature is encrypted and transmitted with a software update package 60, in other examples it could be omitted from the software update package 60 and instead distributed to the device 2 in some other ways, such as by being requested from a server maintained by a certification authority responsible for management of certificates associated with a public key infrastructure (PKI). At step 108 the generated software update package including the encrypted code and data 62 is made available to the relevant class of the devices, for example by the devices downloading the update file over a communication network.

FIG. 8 illustrates a process for retrieving the previously injected software decryption key from the storage of the device and using the software decryption key to decrypt an encrypted software package stored locally within the device or received in an over-the-air update. The software decryption key 38 is stored in protected form in a key storage location which may be accessible to the code executing in the less secure environment 22. When the device boots and needs to run the updated software that was received in the encrypted package, then the software decryption key is copied to a secure region of memory while still in the protected form (e.g. copied while still being encrypted based on the device private key 34). The wrapped software decryption key is provided to the RTM 26 which is a component of the trusted execution environment 20 able to provide the application ID bound to the wrapped secure object so that it is the only component allowed to unwrap the secure object containing the key 38. The RTM 26 controls decryption of the wrapped key based on the device private key 34 which is securely stored within a region accessible only to code executing in the secure world 20. As the stored software decryption key 38 was bound to the combination of the device private key 34 and a unique identifier associated with either the RTM 26 itself or the key injection TA 36 (whose ID is impersonated by the RTM 26), this prevents the software decryption key 38 being accessible in the clear by any component other than the RTM 26. The RTM 26 and the region of secure memory in which the software decryption key is decrypted are protected within the secure world 20 by the hardware architecture from inappropriate tampering by external devices or by insecure code running in the less secure execution environment 22. Hence the software decryption key 115 is obtained in the clear and this class key is then used to decrypt the software received within the software package 60. The signature associated with the updated software is also verified based on the attestor's public key 68 and if the signature verification is successful then the decrypted software 120 is allowed to be executed. The decryption 122 of the software based on the software decryption key is performed in-place within a secure region of the memory 6 which is accessible only to code executing in the secure execution environment 20. Both the unwrapping of the software decryption key and the decryption of the software package 60 are performed only when needed and the secure domain code avoids retaining the decrypted software decryption key 115 and decrypted software 120 for longer than needed, for example by deleting them after use.

FIG. 9 shows a flow diagram illustrating a method of handling the decryption of the software to be run within the secure operating environment 20. At step 150 a request is made by code executing in the less secure environment to install the software updates received in the update package, or to boot or execute software codes stored in encrypted form, and the software package 60 is then obtained from less secure memory by the RTM 26. The encrypted software code/data 62 is copied into secure memory. At step 152 it is determined whether the control portion specifies that decryption is required. If not then at step 154 the RTM verifies the signature associated with the code and data and if signature verification is determined to be successful at step 156 then the installation, booting or running of the updated software is allowed at step 158, while if the signature verification is unsuccessful and it cannot be verified that the software came from a trusted party then at step 160 the installation, booting or running of the updated software is prevented.

On the other hand if the control portion 64 associated with the software 60 specified that decryption is required, then at step 162 the RTM 26 obtains the wrapped software decryption key 38 from the less secure region of memory. If the control portion 152 specifies a particular key ID then the RTM 26 obtains the wrapped key which is identified by the specified key ID mentioned in the control portion. The software decryption key is a class key shared between a class of devices and injected using the method discussed above. At step 164, the indication that encryption is required is removed temporarily from the control portion prior to verifying the signature of the software at step 166. This ensures that the presence of a flag or version number indicating whether encryption is applied does not affect the signature verification and the same signature can be used regardless of whether decryption is required or not. In parallel with verification of the signature, at step 168 the wrapped key is unwrapped by the RTM 26 by decrypting the key using the device private key 34, with the key being decrypted in place within secure region of memory. At step 170 the unwrapped key is then used to decrypt the code/data 62 associated with the software, based on the encryption parameters 65 specified for the software package 60. Again, the decryption is performed in place within secure memory. In other examples rather than performing the decryption in parallel with the signature verification, the decryption could be performed first and the signature verified afterwards, however, some encryption/decryption algorithms may support simultaneous decryption and signature verification as part of the algorithm, for example AES-GCM. As for the case where no decryption was required, at step 156 it is again checked whether the signature verification was successful and depending on whether verification was successful the installation/boot/running of the software is either allowed or prevented at steps 158 and 160.

Further examples are set out in the following clauses:

(1) A key injection method for a computing device having a secure execution environment and a less secure execution environment, wherein program code or data associated with the secure execution environment is isolated from access by program code executed in the less secure execution environment; the method comprising:

providing a software decryption key for decryption of software to be run on the computing device, wherein the software decryption key is a class key shared between a class of devices including said computing device;

using a key injection software component executed within the secure execution environment of the computing device, controlling storage of the software decryption key in a protected state in a key storage location accessible to the computing device;

the protected state comprising a state in which the software decryption key is unreadable in the clear from the key storage location by an external device or by program code executed in the less secure execution environment of the computing device.

(2) The method of clause (1), in which the protected state comprises a state in which the software decryption key is encrypted based on a device key which is private to the computing device and is inaccessible to the program code executed in the less secure execution environment.

(3) The method of clause (2), in which the key storage location is accessible to the external device or to the program code executed in the less secure execution environment.

(4) The method of clause (1), in which the protected state comprises a state in which the software decryption key is stored in a storage region which is accessible to program code executed in the secure execution environment and inaccessible to the external device or the program code executed in the less secure execution environment.

(5) The method of any preceding clause, in which when the software decryption key is stored in the protected state, the software decryption key is unreadable in the clear by a software component other than a predetermined control software component of the secure execution environment and said key injection software component.

(6) The method of clause (5), in which when stored in the protected state, the software decryption key is also unreadable in the clear from the key storage location by the key injection software component.

(7) The method of any preceding clause, in which the key injection method is performed by an original equipment manufacturer (OEM) of the computing device, the computing device comprising a system-on-chip manufactured by a different manufacturer to said OEM.

(8) The method of clause (7), in which the software decryption key is independent of the manufacturer of the system-on-chip.

(9) The method of any preceding clause, in which an in-field software image to be provided on the computing device when the device is released for in-field use excludes said key injection software component.

(10) The method of any preceding clause, in which said key injection software component is prohibited from overwriting a previously injected software decryption key.

(11) The method of any preceding clause, in which the software decryption key is stored in the protected state in association with a key identifier distinguishing the software decryption key from other software decryption keys.

(12) The method of any preceding clause, in which the software decryption key is passed to the key injection software component by a further key injection software component running in the less secure execution environment.

(13) A method for a computing device having a secure execution environment and a less secure execution environment, wherein program code or data associated with the secure execution environment is isolated from access by program code executed in the less secure execution environment; the method comprising:
using a control software component running within the secure execution environment:
obtaining a software decryption key stored in a key storage location in a protected state, the protected state comprising a state in which the software decryption key is unreadable in the clear from the key storage location by an external device or by program code executed in the less secure execution environment of the computing device; and
using the obtained software decryption key, decrypting target software to be run on the computing device;
wherein the software decryption key is a class key shared between a class of devices including said computing device.

(14) The method of clause (13), in which the software decryption key is stored in the protected state within a software-writable storage location.

(15) The method of any of clauses (13) and (14), in which the protected state comprises a state in which the software decryption key is stored in encrypted form based on a device key which is private to the computing device and is inaccessible to the program code executed in the less secure execution environment; and
the control software component controls decryption of the software decryption key based on the device key.

(16) The method of clause (15), in which the key storage location is accessible to the program code executed in the less secure execution environment.

(17) The method of clause (16), in which, to decrypt the software decryption key, the control software component copies the software decryption key in encrypted form from the key storage location to a second storage location inaccessible to the program code executed in the less secure execution environment, and decrypts the software decryption key in-place within the second storage location.

(18) The method of any preceding clause, in which the target software is associated with a control portion comprising an encryption status indication indicating that the target software requires decryption.

(19) The method of any preceding clause, in which the target software is associated with a control portion specifying a key identifier for identifying which software decryption key is to be obtained for decrypting the target software.

(20) The method of any of clauses (1) to (18), in which the control software component obtains the software decryption key in an encrypted form from a requesting software component executed in the less secure execution environment, which is requesting execution of the target software.

(21) The method of any of clauses (18) and (19), in which decryption of the target software is dependent on the software decryption key and at least one encryption parameter specified in the control portion.

(22) The method of any preceding clause, in which the software decryption key is a symmetric key.

(23) The method of any preceding clause, wherein startup of the target software following decryption is dependent on successful verification of a signature associated with the target software.

(24) The method of clause (23), in which when the target software is associated with a control portion comprising an encryption status indication indicating that the target software requires decryption, the method comprises verification of the signature based on a version of the control portion in which the encryption status indication has been removed or updated to indicate that the target software does not require decryption.

(25) The method of any preceding clause, in which the target software is software to be executed within the secure execution environment.

(26) The method of any preceding clause, in which the target software is updatable through an over-the-air update.

(27) A method for providing an over-the-air update for target software to be run on a given class of computing devices; the method comprising:
using a class key shared between said given class of computing devices, encrypting updated software for said target software;
providing a control portion comprising at least:
an encryption status indication indicating that the updated software requires decryption; and
a key identifier for identifying the class key used to encrypt the updated software; and
making a software update package available to the given class of computing devices, the software update package including the encrypted updated software and the control portion.

(28) The method of clause (27), in which the class key used for encrypting the updated software is the same as a class key used to encrypt a previous version of the updated software.

(29) The method of any of clauses (27) and (28), in which the control portion also specifies at least one encryption parameter for use in a decryption algorithm for decrypting the updated software using the class key.

(30) The method of any of clauses (27) to (29), in which the software update package comprises a signature attesting to a source of the software update package.

(31) The method of clause (30), in which the signature is generated based on an unencrypted version of the updated software, prior to encrypting the updated software using the class key.

(32) At least one computer program to control a device to perform the method of any preceding clause.

(33) At least one storage medium to store at least one computer program of clause (31).

(34) An apparatus comprising:
    processing circuitry to perform data processing; and
    data storage storing at least one computer program for controlling the processing circuitry to perform the method of any of clauses (1) to (31).

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A key injection method for a computing device having a secure execution environment and a less secure execution environment, wherein program code or data associated with the secure execution environment is isolated from access by program code executed in the less secure execution environment; the method comprising:
    providing a software decryption key for decryption of software to be run on the computing device, wherein the software decryption key is a class key shared between a class of devices including said computing device;
    using a key injection software component executed within the secure execution environment of the computing device, controlling storage of the software decryption key in a protected state in a key storage location accessible to the computing device;
    the protected state comprising a state in which the software decryption key is unreadable in the clear from the key storage location by an external device or by program code executed in the less secure execution environment of the computing device,
    wherein the key injection method is performed by an original equipment manufacturer of the computing device, the computing device comprising a system-on-chip manufactured by a different manufacturer than the original equipment manufacturer of the computing device; and
    wherein the software decryption key is selectively provided to a subset of manufacturers involved in the manufacture of the computing device including the original equipment manufacturer.

2. The method of claim 1, in which the protected state comprises a state in which the software decryption key is encrypted based on a device key which is private to the computing device and is inaccessible to the program code executed in the less secure execution environment.

3. The method of claim 2, in which the key storage location is accessible to the external device or to the program code executed in the less secure execution environment.

4. The method of claim 1, in which the protected state comprises a state in which the software decryption key is stored in a storage region which is accessible to program code executed in the secure execution environment and inaccessible to the external device or the program code executed in the less secure execution environment.

5. The method of claim 1, in which when the software decryption key is stored in the protected state, the software decryption key is unreadable in the clear by a software component other than a predetermined control software component of the secure execution environment and said key injection software component.

6. The method of claim 5, in which when stored in the protected state, the software decryption key is also unreadable in the clear from the key storage location by the key injection software component.

7. The method of claim 1, in which an in-field software image to be provided on the computing device when the device is released for in-field use excludes said key injection software component.

8. The method of claim 1, in which said key injection software component is prohibited from overwriting a previously injected software decryption key.

9. The method of claim 1, in which the software decryption key is stored in the protected state in association with a key identifier distinguishing the software decryption key from other software decryption keys.

10. The method of claim 1, in which the target software is associated with a control portion comprising an encryption status indication indicating that the target software requires decryption, wherein decryption of the target software is dependent on the software decryption key and at least one encryption parameter specified in the control portion.

11. The method of claim 1, in which the target software is associated with a control portion specifying a key identifier for identifying which software decryption key is to be obtained for decrypting the target software, wherein decryption of the target software is dependent on the software decryption key and at least one encryption parameter specified in the control portion.

12. The method of claim 1, in which the control software component obtains the software decryption key in an encrypted form from a requesting software component executed in the less secure execution environment, which is requesting execution of the target software.

13. The method of claim 1, wherein startup of the target software following decryption is dependent on successful verification of a signature associated with the target software, wherein when the target software is associated with a control portion comprising an encryption status indication indicating that the target software requires decryption, the method comprises verification of the signature based on a version of the control portion in which the encryption status indication has been removed or updated to indicate that the target software does not require decryption.

14. A method for a computing device having a secure execution environment and a less secure execution environment and comprising a system-on-chip, wherein program code or data associated with the secure execution environment is isolated from access by program code executed in the less secure execution environment; the method comprising:

using a control software component running within the secure execution environment:

obtaining a software decryption key stored in a key storage location in a protected state, the protected state comprising a state in which the software decryption key is unreadable in the clear from the key storage location by an external device or by program code executed in the less secure execution environment of the computing device, wherein the software decryption key has been previously provided to the computing device by an original equipment manufacturer of the computing device, the original equipment manufacturer of the computing device being a different manufacturer than the manufacturer of the system-on-chip, and wherein the software decryption key is selectively provided to a subset of manufacturers involved in the manufacture of the computing device including the original equipment manufacturer; and using the obtained software decryption key, decrypting target software to be run on the computing device;

wherein the software decryption key is a class key shared between a class of devices including said computing device.

15. The method of claim 14, in which the software decryption key is stored in the protected state within a software-writable storage location.

16. The method of claim 14, in which the protected state comprises a state in which the software decryption key is stored in encrypted form based on a device key which is private to the computing device and is inaccessible to the program code executed in the less secure execution environment; and the control software component controls decryption of the software decryption key based on the device key.

17. The method of claim 16, in which the key storage location is accessible to the program code executed in the less secure execution environment, wherein, to decrypt the software decryption key, the control software component copies the software decryption key in encrypted form from the key storage location to a second storage location inaccessible to the program code executed in the less secure execution environment, and decrypts the software decryption key in-place within the second storage location.

* * * * *